US008140006B2

(12) United States Patent  
Song et al.

(10) Patent No.: US 8,140,006 B2  
(45) Date of Patent: *Mar. 20, 2012

(54) SIGNAL COMBINING APPARATUS SATISFYING MAXIMUM TRANSMISSION CAPACITY IN CELLULAR SYSTEM EMPLOYING DISTRIBUTED ANTENNAS AND RESOURCE ALLOCATION METHOD USING THE SAME

(75) Inventors: Ki-Uk Song, Suwon-si (KR); Seong-Taek Hwang, Pyongtaek-si (KR); Won-Jin Sung, Seoul (KR); Jin-Woo Choe, Seoul (KR); Jong-Hyun Park, Seoul (KR); Eui-Seok Song, Seoul (KR)

(73) Assignees: Samsung Electronics Co., Ltd., Maetan-Dong, Yeongtong-Gu, Suwon-Si, Gyeonggi-Do (KR); Industry-University Cooperation Foundation Sogang University, Sinsu-Dong, Mapo-Gu, Seoul (KR)

( * ) Notice: Subject to any disclaimer, the term of this patent is extended or adjusted under 35 U.S.C. 154(b) by 922 days.

This patent is subject to a terminal disclaimer.

(21) Appl. No.: 12/170,528

(22) Filed: Jul. 10, 2008

(65) Prior Publication Data

US 2009/0017835 A1 Jan. 15, 2009

(30) Foreign Application Priority Data

Jul. 11, 2007 (KR) .................. 10-2007-0069554

(51) Int. Cl.  
*H04B 7/185* (2006.01)  
*H04B 7/14* (2006.01)  
*H04B 3/36* (2006.01)  
(52) U.S. Cl. ............... 455/13.1; 455/7; 455/8; 455/16; 370/315; 370/316; 370/293

(58) Field of Classification Search ............... 455/7, 10, 455/13.1, 16, 24, 8, 452.1, 452.2; 370/316, 370/279, 293, 315  
See application file for complete search history.

(56) References Cited

U.S. PATENT DOCUMENTS 7,953,365 B2 * 5/2011 Lim et al. ............... 455/11.1

FOREIGN PATENT DOCUMENTS

KR 10-0308900 11/2001

OTHER PUBLICATIONS

Mehta, N.B., et al.; Patent Application Publication No. US 2007/0165581 A1; Publication Date: Jul. 19, 2007; "Method and System for Communicating in Cooperative Relay Neworks;". . . . Deng, Xinmin, et al.; "Power Allocation for Cooperative Relaying in Wireless Networks;" IEEE Communication Letters, vol. 9, No. 11; Nov. 2005; pp. 994-996.

* cited by examiner

*Primary Examiner* — Un C Cho  
(74) *Attorney, Agent, or Firm* — Cha & Reiter, LLC

(57) ABSTRACT

Disclosed is a signal combining apparatus and a resource allocation method using the same in a cellular system using distributed antennas. The resource allocation method includes detecting a channel transmission capacity when a signal is transmitted from a single Relay Station (RS) to a Mobile Station (MS), by a Base Station (BS), detecting a channel transmission capacity when transmitting a signal produced by using signal combining by two or more RSs to the MS, by the BS, selecting a channel transmission capacity with a larger gain between the detected channel transmission capacity of the single RS and the detected channel transmission capacity of the two or more RSs, by the BS; and selecting the signal transmitted by the single RS or the signal produced by using the signal combining by the two or more RSs having the selected channel transmission capacity with the larger gain, and then transmitting the selected signal to the MS.

12 Claims, 6 Drawing Sheets

SIGNAL COMBINING APPARATUS SATISFYING MAXIMUM TRANSMISSION CAPACITY IN CELLULAR SYSTEM EMPLOYING DISTRIBUTED ANTENNAS AND RESOURCE ALLOCATION METHOD USING THE SAME

CLAIM OF PRIORITY

This application claims the benefit of the earlier filing date, under 35 U.S.C. §119(a), to that patent application entitled "Signal Combining Apparatus Satisfying Maximum Transmission Capacity in Cellular System employing Distributed Antennas and Resource Allocation Method using the Same" filed in the Korean Intellectual Property Office on Jul. 11, 2007 and assigned Serial No. 2007-69554, the contents of which are incorporated herein by reference.

BACKGROUND OF THE INVENTION

1. Field of the Invention

The present invention relates to a cellular communication system using distributed antennas, and more particularly to an algorithm for determining a link combination of a Mobile Station (MS) with a Base Station (BS) or a Relay Station (RS), and a method for allocating resources based on the determined link combination, in a Distributed Antenna System (DAS) where the BS is connected to the Relay Stations by wire or a dedicated line.

2. Description of the Related Art

In the case of a conventional cellular communication system, single-hop scheme and multi hop schemes have been widely used. In the single-hop scheme, one BS exists within a cell and transmits a signal to MSs within a cell coverage area. In the multi-hop scheme, one BS and multiple RSs are arranged within a cell, and the one BS is wirelessly connected to the multiple RSs. In the case of a multi-hop system using multiple wireless RSs partly sharing the wireless resources with the BS, a transmission area is reduced over that of an existing cellular system where only a BS exists, so that it is possible to reduce transmission power. Also, shortening of transmission distance between the RS and an MS causes reduced path loss, so that it possible to transmit data at a higher speed. Accordingly, transmission capacity of the cellular system can be increased.

However, in the case of the multi-hop system utilizing a wireless RS, the transmission for data relay is additionally required, as compared with a single-hop network, and at this time, several relay links must share limited resources. This sharing therefore can deteriorate user service quality. Namely, a wireless RS system can improve a received Signal to Interference plus Noise Ratio (SINR) regarding each MS in an area outside of a cell, but using a part of frame resources for relay transmission causes the reduction of effective channel resources that can be allocated to each MS. Thus, it is hard to significantly increase system transmission capacity. Therefore, in an attempt to overcome the limit of the wireless RS system where the same resources must be transmitted several times from the BS to the RS, studies on a wired RS system where a cell is configured in such a manner that a link between a BS and an RS is connected by an optical cable, are being actively conducted.

A basic configuration of a network of a wired RS system is the same as that of the wireless RS system, but is different in that a link between the BS and the RS or a link between a first RS and a second RS is connected by wire and a fixed RS is used. In the wired RS system, cost is a factor in installing an optical cable between the BS and the RS, and the RS is hard to move after it is installed. However, a wired connection between the BS and the RS causes no signal loss, and interference is reduced as compared with the wireless RS system. Also, by transmitting various kinds of control signals to a wired section between the BS and the RS, a resource allocation technique and a signal combing scheme between RSs, which are restricted to the wireless RS system, can be applied to the wired RS system.

A signal combining technique is largely classified into a microscopic diversity scheme and a macroscopic diversity scheme. In the microscopic diversity scheme, a receiving end or a transmitting end combines signals by using multiple antennas. In the macroscopic diversity scheme, two or more BSs or RSs transmit signals, and each combination between the signals is utilized.

Typical examples of the microscopic diversity scheme include a Selection Combining (SC) scheme for selecting a signal of the best quality among signals received through multiple receiving antennas, a Maximum Ratio Combining (MRC) scheme for maximizing a received signal-to-noise ratio during signal combining, an Equal Gain Combining scheme for matching a phase between received signals and then combining signals having the matched phase, etc.

The macroscopic diversity scheme is different from the microscopic diversity scheme only because a signal combining scheme is applied to signals from two or more BSs or RSs that are geographically remote. The macroscopic diversity scheme uses a Macroscopic Diversity Combining (MDC) scheme utilizing several microscopic diversity schemes based on compensation techniques for performance degradation factors. Such factors are, for example, the difference between time delays of received signals, etc., during signal combining due to geographical characteristics. The microscopic diversity scheme can overcome short-term fading due to multi-path by using multiple antennas to combine signals at transmitting/receiving ends. However, since the microscopic diversity scheme has a limit on improving channel quality due to overcoming long term fading caused by topographical obstacles, the macroscopic diversity scheme is used in order to overcome the long-term fading.

In the macroscopic diversity scheme, signals transmitted from multiple RSs are combined together. Accordingly, the macroscopic diversity scheme can effectively overcome the long-term fading due to topographical obstacles. However, in the macroscopic diversity scheme, the multiple RSs allocate the same frequency resources for signal combining, so that frequency efficiency is reduced due to consuming additional resources as compared with signal transmission by a single RS. Nevertheless, by finding a condition for determining signal combining which offsets the reduced frequency efficiency and enlarges transmission capacity through signal combining, and then allocating resources based on the found condition for determining signal combining, it is possible to significantly improve average frequency efficiency over the signal transmission by a single RS.

Studies have been conducted on hand-off techniques for switching between channels and connecting a relevant communication to a switched channel when, conventionally, one MS moves from a first communication zone of a particular BS to a second communication zone of another BS based on the techniques as described above. A hand-off scheme is largely classified into a hard hand-off scheme and a soft hand-off scheme. In the hard hand-off scheme, an existing channel is disconnected, and a new channel is then connected. In the soft hand-off scheme, an existing channel is disconnected in a state where the existing channel and a new channel are simultaneously connected.

The latter soft hand-off scheme is employed by a conventional cellular system, and the existing soft hand-off scheme uses an SINR-based condition for determining signal combining. Depending on the SINR-based condition for determining signal combining, if a first signal strength regarding an MS from a new cell increases above a particular value relative to a second signal strength regarding the MS from a cell adjacent to the MS, the conventional cellular system employing the existing soft hand-off scheme enters a signal combining mode. Also, depending on the SINR-based condition for determining signal combining, if a signal strength regarding the MS from an existing cell decreases below the particular value, the conventional cellular system employing the existing soft hand-off scheme operates in a single transmission mode related to the new cell again. The existing soft hand-off scheme improves channel quality regarding an MS moving to a boundary area among cells, and prevents a communication disabled state regarding the MS. Accordingly, the existing soft hand-off scheme enables a stable communication satisfying volume required for minimum transmission of a user regardless of geographical conditions within each cell.

However, in terms of the entire cell, the existing soft hand-off scheme doesn't ensure a maximum system transmission capacity Namely, a condition for determining signal combining for the maximum transmission capacity which can be expected during the utilization of the signal combining only performs a threshold value test with SINR values during signal transmission from an adjacent cell. Therefore, the condition for determining signal combining doesn't ensure the maximum system transmission capacity, and has raised problems in performing high-complex and high efficient resource allocation.

SUMMARY OF THE INVENTION

The present invention provides a system for determining a set of combinations between an BS and MSs and between RSs and MSs and then allocating resources in a wired RS system, in which a wired link between the BS and the RS, or between RSs, shares channel information of MSs randomly distributed within the cell during signal combining, thereby maximizing transmission capacity of the entire cell.

In accordance with an aspect of the present invention, a method for allocating resources satisfying a maximum transmission capacity in a cellular system using distributed antennas includes, detecting a channel transmission capacity when a signal is transmitted from a single RS to a MS, by a BS; detecting a channel transmission capacity when transmitting a signal produced by using signal combining by two or more RSs to the MS, by the BS; selecting a channel transmission capacity with a larger gain between the detected channel transmission capacity of the single RS and the detected channel transmission capacity of the two or more RSs, by the BS; and selecting the signal transmitted by the single RS or the signal produced by using the signal combining by the two or more RSs having the selected channel transmission capacity with the larger gain, and then transmitting the selected signal to the MS.

In accordance with another aspect of the present invention, an apparatus for signal combining satisfying a maximum transmission capacity in a cellular system using distributed antennas includes: a BS for comparing a channel transmission capacity of a single RS with a channel transmission capacity according to signal combining by two or more RSs, and then selecting a larger transmission capacity; one or more RSs for transmitting a channel to an MS, wherein the single RS transmits a first channel to the MS, or the two or more RSs transmit a second channel to the MS; and one or more MSs for receiving the first channel transmitted by the BS or the single RS or receiving the second channel according to signal combining transmitted by the two or more RSs.

DETAILED DESCRIPTION OF THE DRAWINGS

The above and other exemplary features, aspects, and advantages of the present invention will be more apparent from the following detailed description taken in conjunction with the accompanying drawings, in which.

DETAILED DESCRIPTION OF THE INVENTION

Exemplary embodiments of the present invention are described in detail with reference to the accompanying drawings. Particulars found in the following description of the present invention, such as specific configuration elements, etc., are provided to provide a comprehensive understanding of the present invention, and it would be obvious to those skilled in the art that various changes in form and details may be made in the particulars without departing from the spirit and scope of the invention. For the purposes of clarity and simplicity, a detailed description of known functions and configurations incorporated herein are omitted as it may make the subject matter of the present invention rather unclear.

As described above, the existing cellular system using distributed antennas employs the soft hand-off scheme using the SINR-based condition for determining signal combining. However, in terms of the entire cell, the soft hand-off scheme doesn't ensure the maximum system transmission capacity, and has raised problems in performing high-complex and high-efficient resource allocation.

The present invention proposes a system which uniquely determines an optimal combination between an BS and an MS or between RSs and the MS regarding any MS existing within a coverage area formed by signal combining between antennas, for example, three RSs, and then performs resource allocation satisfying a maximum transmission capacity for each coverage area formed by the exemplary three RSs in a cell structure of a Distributed Antenna System (DAS). Also, a description is made of the present invention on the assumption that all RSs use the same frequency band and a frequency reuse factor is equal to 1. In the present invention, the role of a BS is defined to be the same as that of an RS, and hereinafter, the BS and the RS are commonly referred to as "BS."

Figure 1:
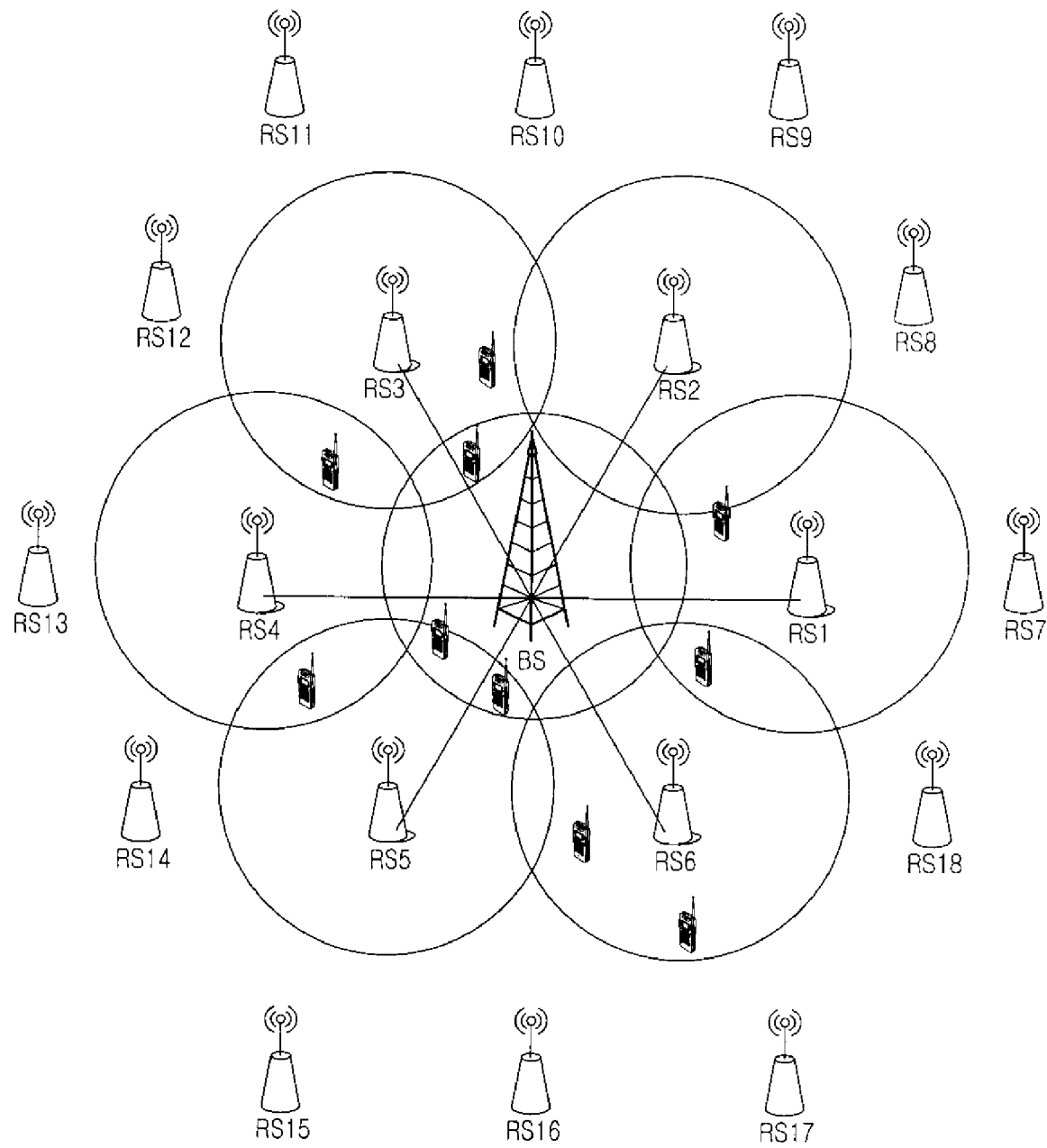
FIG. 1 illustrates an example of an exemplary schematic configuration of a cellular system using distributed antennas to which the present invention is applied.

FIG. 1 illustrates an example of a schematic configuration of a cellular system using distributed antennas to which the present invention is applied. FIG. 1 illustrates a DAS using a wired RS system considered in the present invention, in the DAS, six RSs are connected by wire to one BS, and RSs around the connected RSs are connected to other BSs. An area defined by a circle around each RS illustrates an example of a coverage area including the level of a minimum SINR at which a signal can be transmitted wherein each RS does not' perform signal combining with other RSs but independently transmits the signal within the area. Each overlapping area, among the coverage areas, is an area where signal interference is relatively severe and a significant improvement in channel quality is expected by signal combining among RSs. In a cell as illustrated in FIG. 1, multiple MSs are randomly distributed, and by configuring all possible connection combinations between RSs or between RSs and MSs, signals are transmitted/received through relevant connection combinations.

In the cell structure as illustrated in FIG. 1, a resource allocation scheme utilizing signal combining can be performed in order to maximize a system transmission capacity for each coverage area formed by three RSs, for example, which includes one BS and two RSs and are expressed by "3-RS." Namely, such a unit as each coverage area is defined represents one block, and in a state where scheduling among blocks is first performed in terms of the entire cell, a scheme for determining a set of optimal combinations between RSs and MSs for each block can be implemented. This scheme corresponds to a 3-RS algorithm among algorithms proposed in the present invention. Also, the present invention proposes an extended algorithm regarding an S number of RSs, and accordingly, the resource allocation scheme for each block as described above can be extensively applied to 4-RS and the like. Also, a resource allocation scheme can be performed in order to maximize a system transmission capacity by using a 7-RS extended algorithm considering an entire 7-RS coverage area as illustrated in FIG. 1.

Figure 2A:
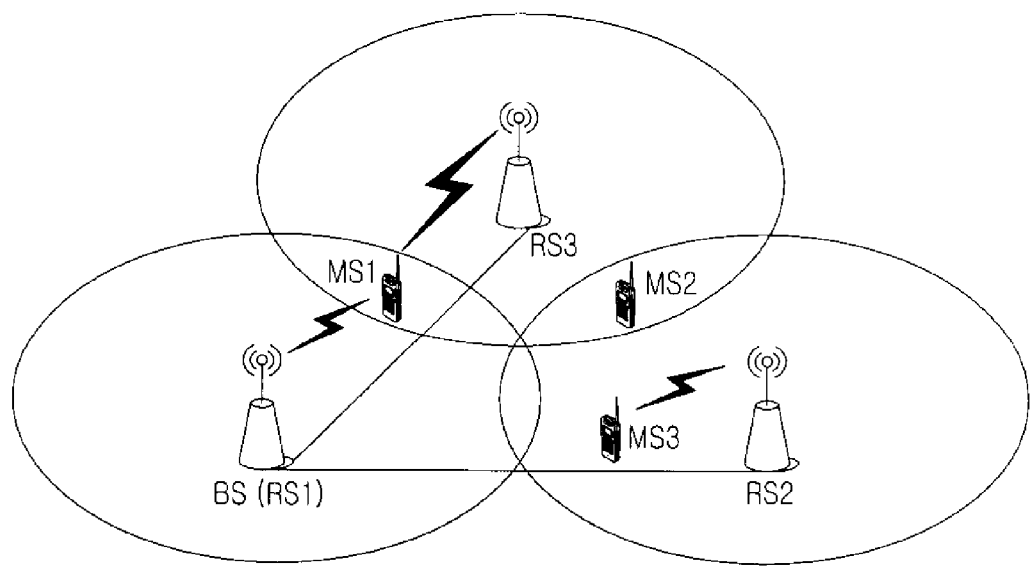
FIGS. 2A and 2B illustrate a schematic configuration of a cellular system for increasing transmission capacity by using signal combining according to an embodiment of the present invention.
Figure 2B:
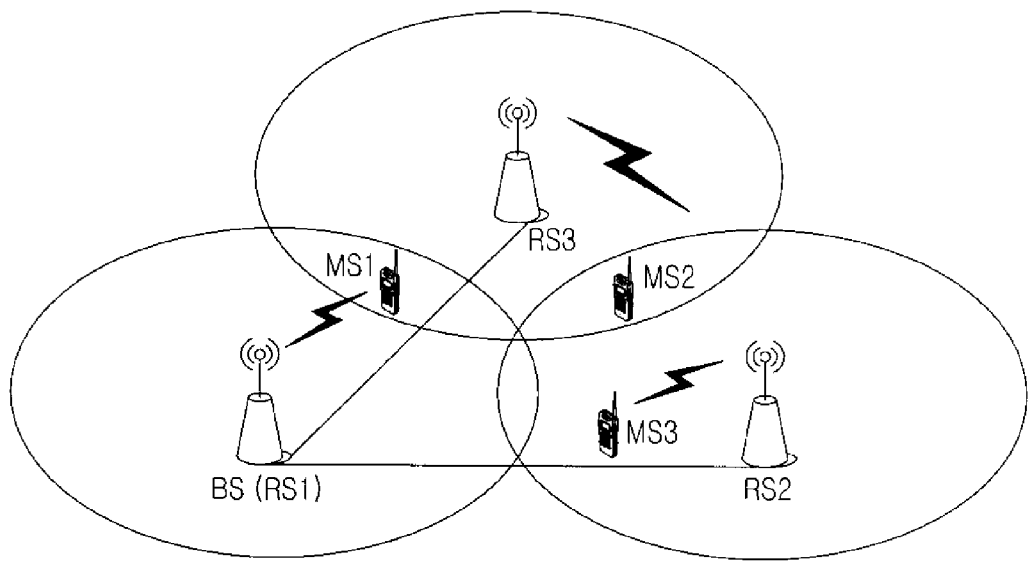

FIGS. 2A and 2B illustrate an exemplary schematic configuration of a cellular system for increasing transmission capacity by using signal combining according to one embodiment of the present invention. Referring to FIGS. 2A and 2B, a wired RS system includes three RSs and three MSs in order to effectively describe a configuration and an operation of each block based on the cell structure as illustrated FIG. 1. Since the wired RS system has a configuration depending on a time slot, a configuration regarding a maximum transmission capacity slot can change depending on each time slot.

First, referring to FIG. 2A, each RS is connected by wire to at least one other RS, and the three MSs are randomly distributed in the block. An MS1 receives a signal produced by using signal combining and transmitted by an RS1 and an RS3, an MS2 doesn't receive a transmitted signal, and an MS3 receives a signal transmitted by a single RS (RS2). It is noted from FIG. 2A that a signal is transmitted only to the MS1 rather than it is fairly distributed and transmitted from the RS3 to the MS1 and the MS2, thereby maximizing an overall transmission capacity.

In FIG. 2B, each of MS1, MS2, and MS3 receive signals transmitted by a corresponding RS. It is noted from FIG. 2B that signals are fairly distributed and transmitted to MSs, thereby maximizing an overall transmission capacity.

FIGS. 2A and 2B illustrate one embodiment to which one time slot is applied, and various embodiments can be implemented on the characteristics of a cellular system employing a time-division scheme.

In order to express an interlocking process according to the present invention by a mathematical model, parameters are defined in Table 1 below.

TABLE 1

| Parameter Name | Definition |
| --- | --- |
| S | the number of RSs |
| Ω | a set of RS indices |
| N | the total number of sub-channels respectively corresponding to RSs |
| K | the number of MSs within a cell |

On the assumption that a channel characteristic for each sub channel is independent, a condition for determining a set of combinations between RSs and MSs which maximizes a system transmission capacity, is independent of a sub-channel index, and thus only the case of N=1 is considered in the present invention. Namely, an algorithm regarding N=1 can be applied in parallel to a general case where multiple sub-channels exist.

An indicator variable called pn,s having an MS index as its value is defined in order to effectively express a resource allocation method considering signal combining. Namely, a case of allocating an MS_k to an n-th sub-channel (or a sub-channel n) of an RS_s as a resource is expressed by "pn,s=k." If pn,p1=pn,p2=k in regard to the n-th sub-channel, it signifies signal combining by an RS_p1 and an RS_p2.

When it is assumed that all of a maximum of "S" RSs can simultaneously participate in signal combining in regard to an S number of RSs and a K number of MSs, the number of all possible combinations between RSs and MSs can be defined by equation (1) below.

$$U = K^S \qquad (1)$$

In equation (1), a complexity of determining a link combination between an RS and an MS considering signal combining in response to an increase of K and S, increases exponentially. Herein, in the case of considering only the signal combining by two RSs, the number of all searches is defined by equation (2) below.

$$U = KP_S + \sum_{i=1}^{\lfloor S/2 \rfloor} \begin{bmatrix} K \\ i \end{bmatrix} \frac{S!}{(S-2i)!2^i} K_{-i} P_{S-2i} \qquad (2)$$

In equation (2), an effective algorithm producing the same results as those of the all searches and a determination condition for performing signal combining are presented and verified based on the assumption of considering only the signal combining between the two RSs.

Herein, the determination condition for performing signal combining signifies an answer to which MS is allocated the total resources of a system given to one sub-channel index by the number of RSs will maximize a system transmission capacity. For example, if the overall system transmission capacity is maximized when both the RS1 and the RS2 transmit a signal produced by using signal combining thereby to the MS1 and RS3 transmits a signal to the MS3, a set of the combinations between RSs and MSs in this case becomes an optimal determination condition for performing signal combining.

An SINR during independent transmission by the RS_s regarding the sub-channel index "n" and the MS_k, and an SINR according to signal combining by the RS_p1 and the RS_p2 are defined by equations (3) and (4) below, respectively.

$$\gamma_{n,k,s}^{(1)} = \frac{P|H_{n,k,s}|^2 / r_{k,s}^{\alpha}}{\sum_{\substack{i=1 \\ i \neq s}}^{S} (P|H_{n,k,i}|^2 / r_{k,i}^{\alpha}) + W} \quad (3)$$

$$\gamma_{n,k,p}^{(2)} = \frac{P(|H_{n,k,p1}| / r_{k,p1}^{\alpha/2} + |H_{n,k,p2}| / r_{k,p2}^{\alpha/2})^2}{\sum_{\substack{i=1 \\ i \neq p1 \\ i \neq p2}}^{S} (P|H_{n,k,i}|^2 / r_{k,i}^{\alpha}) + W} \quad (4)$$

In equations (3) and (4), the variable P represents transmission signal power, and is assumed to have the same value for each RS. The variable $H_{n,k,s}$ is a Rayleigh Fading Channel and represents a complex Gaussian random variable which has an average power of 1 and whose power follows an exponential distribution. The variable $r_{k,s}$ represents a distance between the MS_k and the RS_s. The variable $\alpha$ represents a path loss exponent. The variable W represents the power of white complex Gaussian noise.

When equations (3) and (4) are substituted into the Shannon capacity formula to obtain a transmission capacity for each of the independent signal transmission and the signal transmission according to the signal combining, they can be defined by equations (5) and (6) below, respectively.

$$\Psi_{k,s}^{(1)} = \log_2(1 + \gamma_{n,k,s}^{(1)}) \quad (5)$$

$$\Psi_{k,p}^{(2)} = \log_2(1 + \gamma_{n,k,o}^{(2)}) \quad (6)$$

Equation (5) is a mathematical formula expressing a transmission capacity when one sub-channel of the RS_s is used. Equation (6) is a mathematical formula expressing a transmission capacity when the signal combination by the RS_p1 and the RS_p2 (i.e. a total of two sub-channels) is used.

When composing matrices respectively having equations (5) and (6) as their elements in regard to all combinations of an index "k,s,p," the matrices can be defined by equations (7) and (8) below, respectively.

$$A = \begin{bmatrix} \Psi_{1,1}^{(1)} & \Psi_{1,2}^{(1)} & \cdots & \Psi_{1,S}^{(1)} \\ \Psi_{2,1}^{(1)} & \Psi_{2,2}^{(1)} & \cdots & \Psi_{2,S}^{(1)} \\ \vdots & \vdots & \ddots & \vdots \\ \Psi_{K,1}^{(1)} & \Psi_{K,2}^{(1)} & \cdots & \Psi_{K,S}^{(1)} \end{bmatrix} \quad (7)$$

$$B = \begin{bmatrix} \Psi_{1,1}^{(2)} & \Psi_{1,2}^{(2)} & \cdots & \Psi_{1,Q}^{(2)} \\ \Psi_{2,1}^{(2)} & \Psi_{2,2}^{(2)} & \cdots & \Psi_{2,Q}^{(2)} \\ \vdots & \vdots & \ddots & \vdots \\ \Psi_{K,1}^{(2)} & \Psi_{K,2}^{(2)} & \cdots & \Psi_{K,Q}^{(2)} \end{bmatrix} \quad (8)$$

By using multiple mathematical formulas, the following description will be made of a process for determining optimal combinations of links between RSs and MSs, which maximize a system transmission capacity through the matrices A and B in equations (7) and (8).

When first composing a matrix computed based on only elements of the matrices A and B in equations (7) and (8), in order to express a determination condition for performing signal combining by a mathematical formula, the matrix can be defined by equation (9) below.

$$D = \begin{bmatrix} \Delta_{1,1} & \Delta_{1,2} & \cdots & \Delta_{1,Q} \\ \Delta_{2,1} & \Delta_{2,2} & \cdots & \Delta_{2,Q} \\ \vdots & \vdots & \ddots & \vdots \\ \Delta_{K,1} & \Delta_{K,2} & \cdots & \Delta_{K,Q} \end{bmatrix} \quad (9)$$

A method for computing each element in the matrix D of equation (9) can be defined by equation (10) below.

$$\Delta_{k,p} = \Psi_{k,p}^{(2)} - \sum_{j=1}^{2} \left( \max_{k} \Psi_{k,p_j}^{(1)} \right) \quad (10)$$

Equation (10) is a value obtained by subtracting the value of a maximum transmission capacity, which can be obtained during no signal combining, from a first term equivalent to the value of a transmission capacity during the signal combining. Namely, in equation (10), the first term represents each element of the matrix B in equation (8), and takes the form of subtracting a second term from the first term. The second term is obtained by adding maximum transmission capacities during independent signal transmission in regard to a pair of p1 and p2 related to signal combining and corresponding to an index "p" of the first term, and is determined to be an element having the largest value among a K number of elements belonging to each column in equation (7).

When a maximum value of the matrix D in equation (9) having values determined in the manner as described above as elements (i.e. a determination condition for performing signal combining in terms of maximizing the system transmission capacity) is expressed by a mathematical formula, that is, it can be defined by math formula (11) below.

$$\Delta_{k',p} > 0, \text{ wherein } k' = \arg\max_{k} \Delta_{k,p} \quad (11)$$

In formula (11), when the gain of the transmission capacity is generated during the signal combining, namely, only when the $\Delta_{k,p}$ is larger than zero, the signal combining is applied. If the $\Delta_{k,p}$ is equal to zero, as defined by equation (12) below, the resources of the two sub-channels are equally consumed and the left side of equation 12, i.e., a transmission capacity during the signal combining is equal to the right side of equation 12, i.e., a transmission capacity during no signal combining. Accordingly, a gain according to the signal combining is not generated.

$$\Delta_{k',p} = \max_{k} \Psi_{k,p}^{(2)} - \sum_{j=1}^{2} \left( \max_{k} \Psi_{k,p_j}^{(1)} \right) \quad (12)$$
$$= 0 \Leftrightarrow \max_{k} \Psi_{k,p}^{(2)}$$
$$= \sum_{j=1}^{2} \left( \max_{k} \Psi_{k,p_j}^{(1)} \right)$$

When the $\Delta_{k,p}$ is smaller than zero differently from equations (11) and (12), a transmission capacity during no signal combining is larger than a transmission capacity during the signal combining, and accordingly, independent signal transmission is performed by each RS. Namely, if the $\Delta_{k,p}$, a maximum value of a transmission capacity regarding a fixed "p" is larger than zero, a gain becomes equal to $\Psi_{k,p}^{(2)}$ through the signal combining. If the $\Delta_{k,p}$ is smaller than zero, a gain becomes equal to "max $\Psi_{k,p1}^{(1)}$+max $\Psi_{k,p2}^{(1)}$" a through the independent signal transmission by each RS.

A metric δ, the determination condition for performing signal combining, can be defined by the matrices A and B in equations (7) and (8). Before defining the metric δ, maximum values for each column in the matrices A and B can be expressed by vectors that are defined by equations (13) and (14) below, respectively.

$$a = \begin{bmatrix} \max_k \Psi_{k,1}^{(1)} & \max_k \Psi_{k,2}^{(1)} & \ldots & \max_k \Psi_{k,S}^{(1)} \end{bmatrix} \quad (13)$$

$$b = \begin{bmatrix} \max_k \Psi_{k,1}^{(2)} & \max_k \Psi_{k,2}^{(2)} & \ldots & \max_k \Psi_{k,Q}^{(2)} \end{bmatrix} \quad (14)$$

By using the vectors defined by equations (13) and (14), the metric d can be defined by equation (15) below.

$$\delta_p = b_p - \sum_{j=1}^{2} a_{p_j} \quad (15)$$

The metric δ defined by equation (15) has the same form as the determination condition for performing signal combining in math formula (11), and is defined by equation (16) below.

$$\Delta_{k',p} = \max_k \Psi_{k,p}^{(2)} - \sum_{j=1}^{2} \left( \max_k \Psi_{k,p_j}^{(1)} \right) \quad (16)$$

$$= b_p - \sum_{j=1}^{2} a_{p_j}$$

$$= \delta_p$$

A set of optimal combinations between RSs and MSs can be obtained by the metric δ, the determination condition for performing signal combining in equation (15), by using the vectors a and b determined independently of the number K, instead of using the transmission capacity matrices A and B regarding the K number of MSs existing within the cell.

A resource allocation algorithm regarding the 3-RS case according to the present invention is defined in Table 2 below by using the metric δ defined by equation (15), and a set of combinations between RSs and MSs maximizing a system transmission capacity is uniquely determined by the defined resource allocation algorithm.

TABLE 2

Performance Procedure (3-RS Algorithm):
Calculate d = [δ₁  δ₂  δ₃]

Choose $p' = \operatorname{argmax}_p \delta_p$ and $k' = \operatorname{argmax}_k \Psi_{k,p'}^{(2)}$ TABLE 2-continued If $\delta_{p'} > 0$ $\rho_{n,p'1} = \rho_{n,p'2} = k'$ $\rho_{n,s'} = \operatorname{argmax}_k \Psi_{k,s'}^{(1)}$ where $s' \in \Omega$, $s' \neq p'1$, $s' \neq p'2$ else
   for s = 1 : S $\rho_{n,s} = \operatorname{argmax}_k \Psi_{k,s}^{(1)}$ end
end The performance of a relevant algorithm can be evaluated through probability distribution analysis of the system transmission capacity regarding the 3-RS proposed in the present invention based on the resource allocation algorithm in Table 2.

Figure 3A:
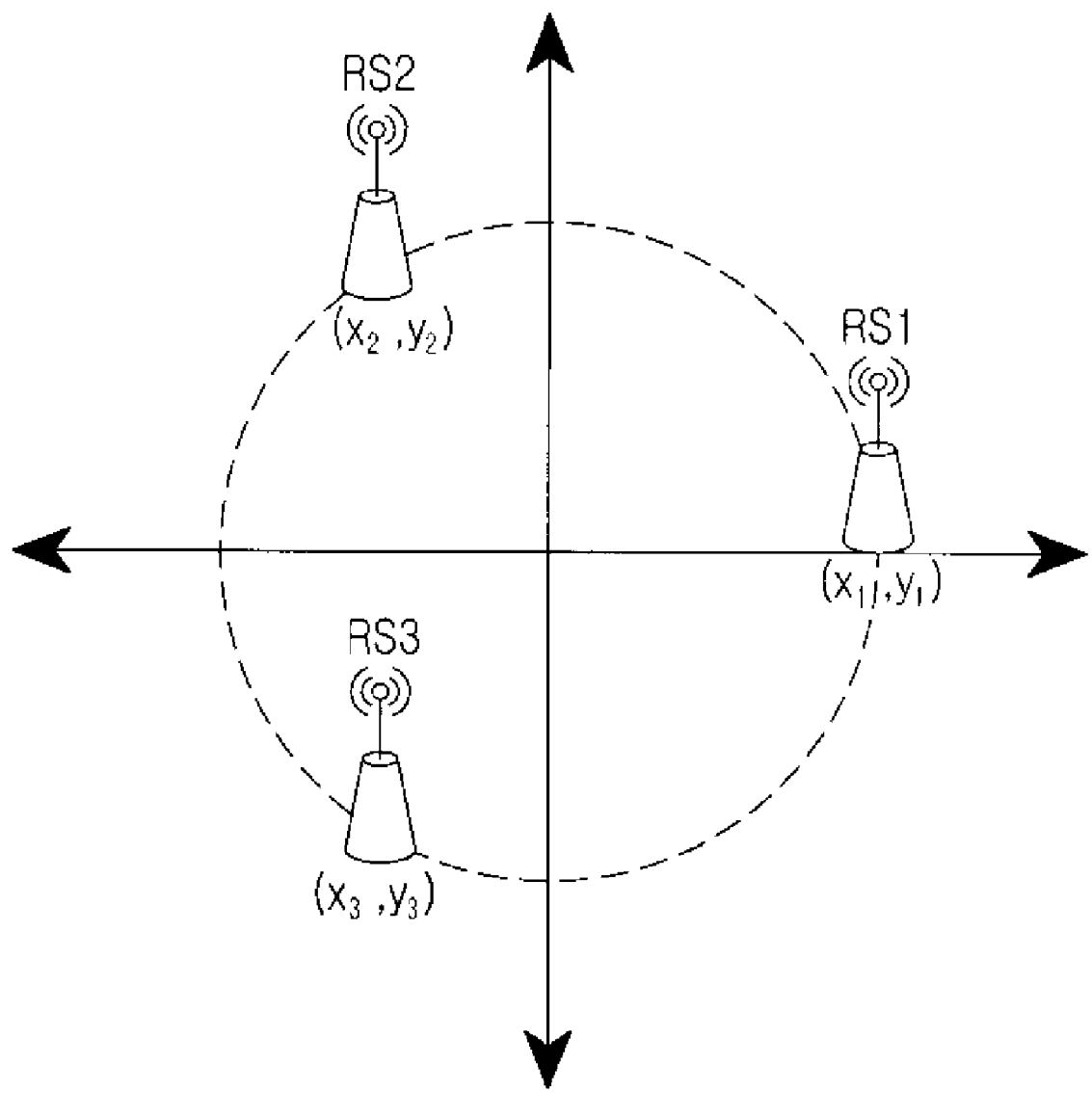
FIG. 3A is a diagram illustrating the arrangement of 3-RS for performance verification of an algorithm according to an embodiment of the present invention.

FIG. 3A is a diagram illustrating the arrangement of the 3-RS for performance verification of an algorithm according to an embodiment of the present invention. For performance evaluation, an arrangement structure of the RSs as illustrated in FIG. 3A is based on the assumption that each RS is located on a circumference represented by a dotted line and the radius of a circle is equal to 1 km. Also, it is assumed that a K number of MSs are randomly distributed within the circle represented by the dotted line and other external interference signals don't exist. Namely, in the present invention, the maximum number of RSs simultaneously participating in signal combining is fixed to two, and accordingly, a signal from the one RS acts as an interference signal during the signal combining by the 3-RS. Transmission signal power from each RS is equal to P=20 W, and a path loss exponent is equal to 2, so that it is assumed that a white complex noise signal doesn't exist. As described above, the complex Gaussian random variable $H_{n,k,s}$ represents the Rayleigh fading channel having the average power of 1, and the channel power thereof follows the exponential distribution.

A location of the s-th RS is computed by equation (17) below.

$$(x_s, y_s) = \left( \cos\left[\frac{2\pi}{S}(s-1)\right], \sin\left[\frac{2\pi}{S}(s-1)\right] \right) \quad (17)$$

Figure 3B:
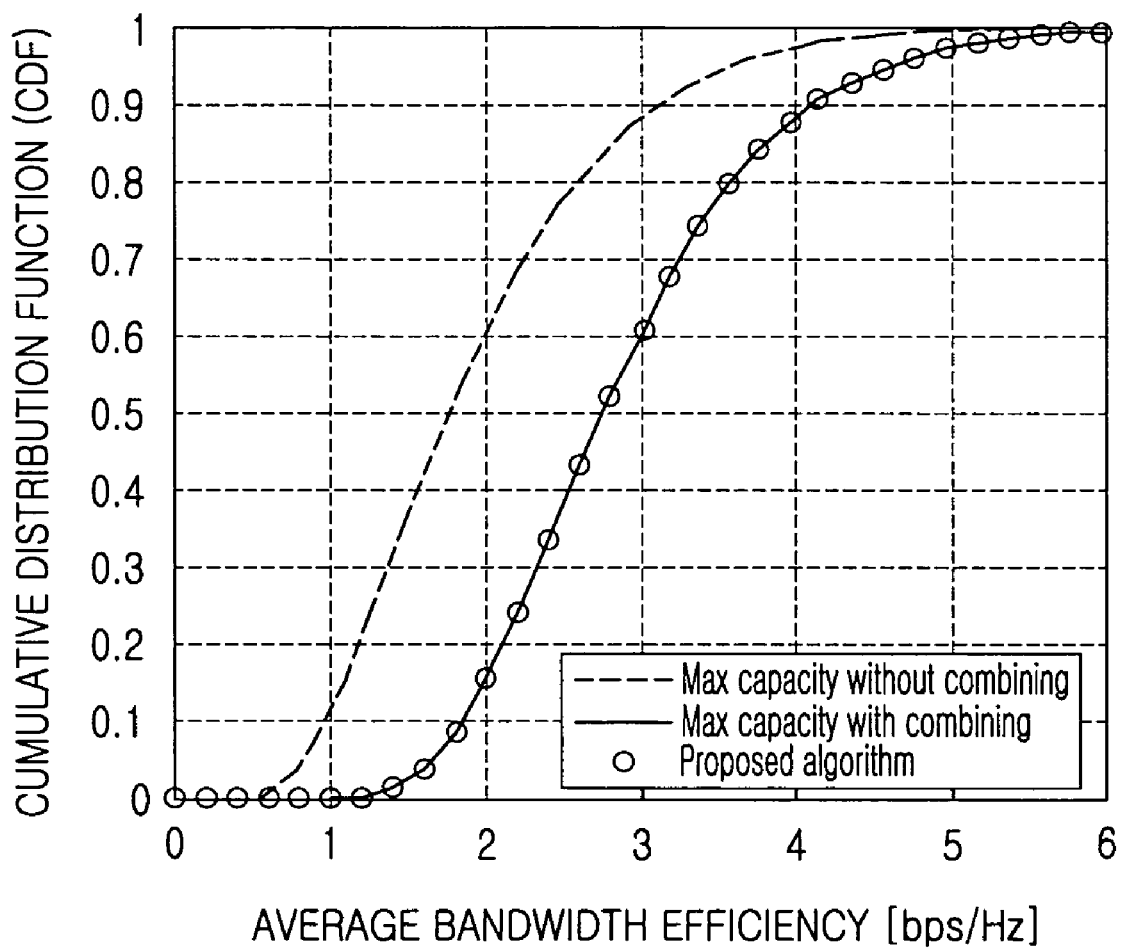
FIG. 3B is a graph illustrating a Cumulative Distribution Function (CDF) regarding an average transmission capacity of a 3-RS system according to an embodiment of the present invention.

FIG. 3B is a graph illustrating a Cumulative Distribution Function (CDF) regarding an average transmission capacity of the 3-RS system according to one embodiment of the present invention, and shows results of drawing the CDF of a maximum value of the average transmission capacity of the system regarding the 3-RS.

Referring to FIG. 3B, a scheme proposed in the present invention exactly coincides with a performance curve of a partial search, and this coincidence signifies that a set of optimal combinations between RSs and MSs is uniquely determined by the determination condition for performing signal combining as proposed above.

Figure 4A:
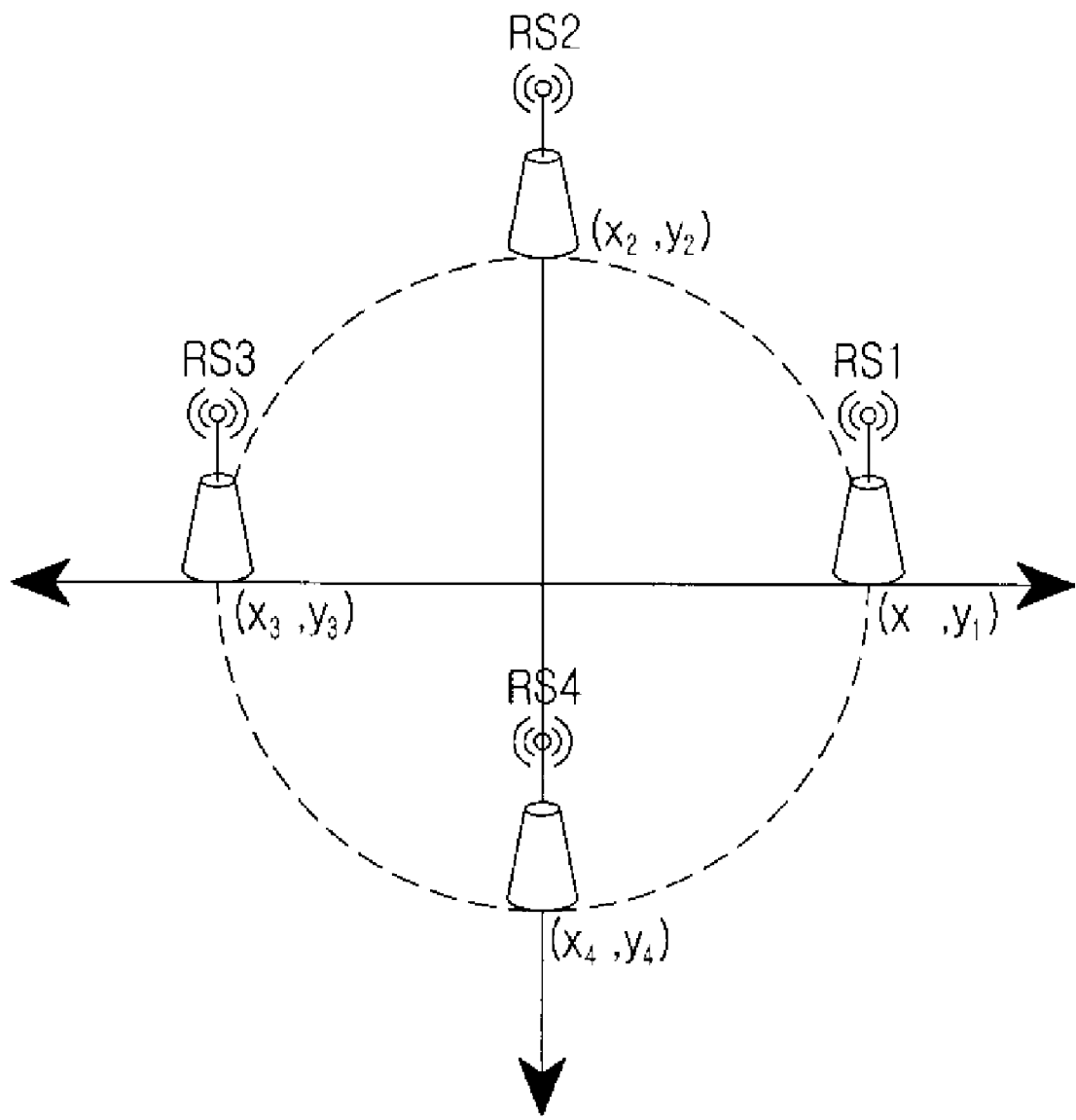
FIG. 4A is a diagram illustrating the arrangement of 4-RS for performance verification of an algorithm according to an embodiment of the present invention.
Figure 4B:
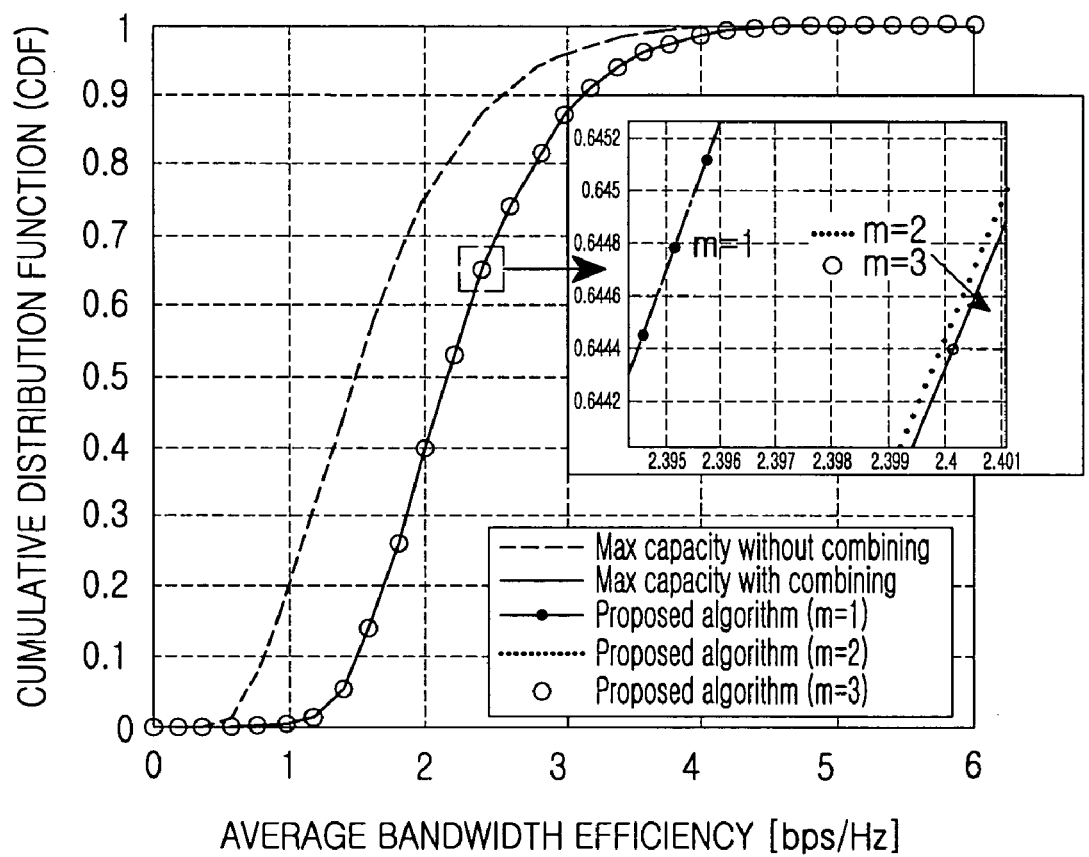
FIG. 4B is a graph illustrating a Cumulative Distribution Function (CDF) regarding an average transmission capacity of a 4-RS system according to an embodiment of the present invention.

FIG. 4A is a diagram illustrating the arrangement of 4-RS for performance verification of an algorithm according to an embodiment of the present invention, and FIG. 4B is a graph illustrating a CDF regarding an average transmission capacity of a 4-RS system according to an embodiment of the present invention.

Referring to FIG. 4A, an arrangement structure of the RSs is based on the assumption that each RS is located on a circumference represented by a dotted line and the radius of a circle is equal to 1 km. Also, it is assumed that a K number of MSs are randomly distributed within the circle represented by the dotted line and other external interference signals don't exist. Namely, in the present invention, the maximum number of RSs simultaneously participating in signal combining is fixed to two, and accordingly, signals from the two RSs act as interference signals during the signal combining by the 4-RS.

Referring to FIG. 4B, a performance curve of a proposed algorithm depending on each change in a search width "m" can be confirmed, and it can be noted in an enlarged graph that an algorithm proposed in the present invention nearly coincides with a performance curve of a partial search when applying a scheme for selecting a set of combinations maximizing a system transmission capacity by using a search width of 3. Also, when the search width is equal to 1, it can be noted in the enlarged graph that a performance difference between the proposed algorithm and the performance curve of the partial search ranges is equal to or less than 0.006 bps/Hz. A CDF curve as illustrated FIG. 4B is located more on the left as a whole than a CDF curve as illustrated FIG. 3B, which is because the number of interference signals increases in response to an increase of the number of RSs.

It can be noted from all results of the two graphs as illustrated in FIGS. 3B and 4B that a large gain is observed during the use of signal combining in terms of the increase in a transmission capacity.

When the algorithm regarding the 3-RS according to the present invention is applied to an S-RS, it is extended to an algorithm in a recursive form as in Table 3 below.

TABLE 3

Performance Procedure (S-RS Algorithm):

Calculate $d = [\delta_1 \quad \delta_2 \quad \ldots \quad \delta_Q]$

Choose $p' = \underset{p}{\operatorname{argmax}}\, \delta_p$ and $k' = \underset{k}{\operatorname{argmax}}\, \Psi^2_{k,p'}$ If $\delta_{p'} > 0$ $\rho_{n,p'1} = \rho_{n,p'2} = k'$ Perform "(S - 2)-RS Algorithm" with $\Omega = \{s_i | s_j \ne p_j' \quad \text{for} \quad \forall i, j\}$ else for s = 1 : S $\rho_{n,s} = \underset{k}{\operatorname{argmax}}\, \Psi^{(1)}_{k,s}$ end end As noted from Table 3, a scheme for selecting a maximum value by defining a metric $\delta_p$ doesn't ensure a set of optimal combinations in regard to four or more RSs. Therefore, it is possible to search for a maximum of m elements in the order of magnitudes thereof in the elements of the vector d in the algorithm as shown in Table 3. In this case, the number of combinations between RSs and MSs combinations obtained depending on each search width "m" is defined by equation (18) below.

$$V_m = m^{\lfloor S/2 \rfloor - 1} \qquad (18)$$

In the algorithm of Table 3, the number "m" is equal to 1, and the number of combinations $V_1$ is equal to 1 regardless of S. When S=4 and m=2, $V_2$ becomes equal to $2^1$, which signifies that a metric $\delta$ used for first considering a pair of RSs among four RSs has the largest value and the second largest value. When S=5, if a pair of RSs is first considered, a set of combinations regarding remaining three RSs is uniquely determined by the 3-RS algorithm as described above. Accordingly $V_2$ also becomes equal to $2^1$. When S=6 or S=7, a pair of RSs is first considered by a search width "m," and it is necessary to search for remaining four or five RSs again by "m". Accordingly, $V_2$ becomes equal to $2^2$.

In regard to a general S-RS, a set of combinations maximizing a system transmission capacity is selected among a $V_m$ number of combinations between RSs and MSs by the method as described above, and resource allocation can then be performed based on the selected set of combinations.

The above-described methods according to the present invention can be realized in hardware or as software or computer code that can be stored in a recording medium such as a CD ROM, an RAM, a floppy disk, a hard disk, or a magneto-optical disk or downloaded over a network, so that the methods described herein can be executed by such software using a general purpose computer, or a special processor or in programmable or dedicated hardware, such as an ASIC or FPGA. As would be understood in the art, the computer, the processor or the programmable hardware include memory components, e.g., RAM, ROM, Flash, etc. that may store or receive software or computer code that when accessed and executed by the computer, processor or hardware implement the processing methods described herein.

As described above, the configuration and the operation of the apparatus for signal combining and the method for allocating resources by using the same satisfying the maximum transmission capacity according to one embodiment of the present invention can be implemented in a cellular system using distributed antennas. Meanwhile, while the invention has been shown and described with reference to certain exemplary embodiments thereof, it will be understood by those skilled in the art that various changes in form and details may be made therein without departing from the spirit and scope of the invention. Therefore, the spirit and scope of the present invention must be defined not by described embodiments thereof but by the appended claims and equivalents of the appended claims.

According to the present invention as described above, by using signal combining between RSs in a wired RS system, a system transmission capacity is effectively maximized, maintaining the same complexity regardless of the number of MSs within a cell, and high-complexity and high-efficient resource allocation is performed, considering all RSs within the cell.

What is claimed is:

1. A method for allocating resources in a cellular system using distributed antennas, the method comprising:

detecting, by a Base Station (BS), a channel transmission capacity when a signal is transmitted from a single Relay Station (RS) to a Mobile Station (MS);

detecting, by the BS, a channel transmission capacity when transmitting a signal produced by using a signal combining by two or more RSs to the MS;

selecting, by the BS, a channel transmission capacity with a larger gain between the detected channel transmission capacity of the single RS and the detected channel transmission capacity of the two or more RSs; and selecting the signal transmitted by the single RS or the signal produced using the signal combining of the two or more RSs having the selected channel transmission capacity with the larger gain, and then transmitting the selected signal to the MS.

2. The method as claimed in claim 1, wherein the signal combining combination is determined by using a metric representing a difference between a maximum transmission capacity during signal combining by the two or more RSs and a maximum transmission capacity during independent signal transmission by the single RS, and the metric is computed by using an equation defined by $$\delta_p = b_p - \sum_{j=1}^{2} a_{p_j},$$

wherein δ represents the metric, a represents a matrix having transmission capacities as elements when one sub-channel is used, and b represents a matrix having transmission capacities as elements when two sub-channels are used.

3. The method as claimed in claim 2, wherein a signal combining equivalent to a maximum value is performed when the metric is larger than zero, and a signal combining is not performed when the metric is smaller than zero.

4. The method as claimed in claim 1, wherein the two or more RSs are defined on a block-to-block basis, and a set of optimal combinations between RSs and MSs is determined for each block in a state where scheduling among blocks is first performed in terms of an entire cell.

5. The method as claimed in claim 1, wherein the signal transmission is performed in parallel for each sub-channel when each RS includes two or more sub channels.

6. An apparatus for signal combining in a cellular system using distributed antennas, the apparatus comprising:
 a Base Station (BS) for comparing a channel transmission capacity of a single Relay Station (RS) with a channel transmission capacity according to signal combining by two or more RSs, and then selecting a larger transmission capacity;
 one or more RSs for transmitting a channel to a Mobile Station (MS), wherein the single RS transmits a first channel to the MS, or the two or more RSs transmit a second channel to the MS; and
 one or more MSs for receiving the first channel transmitted by the BS or the single RS or receiving the second channel according to the signal combining transmitted by the two or more RSs.

7. The apparatus as claimed in claim 6, wherein the RS considers the signal combining between the two or more RSs during the signal combining.

8. An apparatus for allocating resources in a cellular system using distributed antennas, comprising:
 a processor in communication with a memory, the memory including code, which when accessed by the processor causes the process to execute the steps of:
  detecting a channel transmission capacity when a signal is transmitted from a single Relay Station (RS) to a Mobile Station (MS), by a Base Station (BS);
  detecting a channel transmission capacity when transmitting a signal produced by using a signal combining by two or more RSs to the MS, by the BS;
  selecting a channel transmission capacity with a larger gain between the detected channel transmission capacity of the single RS and the detected channel transmission capacity of the two or more RSs, by the BS; and
  selecting the signal transmitted by the single RS or the signal produced by using the signal combining by the two or more RSs having the selected channel transmission capacity with the larger gain, and then transmitting the selected signal to the MS.

9. The apparatus as claimed in claim 8, wherein a signal combining combination is determined by using a metric representing a difference between a maximum transmission capacity during signal combining by the two or more RSs and a maximum transmission capacity during independent signal transmission by the single RS, and the metric is computed by using an equation defined by $$\delta_p = b_p - \sum_{j=1}^{2} a_{p_j},$$

wherein δ represents the metric, a represents a matrix having transmission capacities as elements when one sub-channel is used, and b represents a matrix having transmission capacities as elements when two sub-channels are used.

10. The apparatus as claimed in claim 9, wherein the signal combining equivalent to a maximum value is performed when the metric is larger than zero, and a signal combining is not performed when the metric is smaller than zero.

11. The apparatus as claimed in claim 8, wherein the two or more RSs are defined on a block-to-block basis, and a set of optimal combinations between RSs and MSs is determined for each block in a state where scheduling among blocks is first performed in terms of an entire cell.

12. The apparatus as claimed in claim 1, wherein the signal transmission is performed in parallel for each sub channel when each RS includes two or more sub-channels.

\* \* \* \* \*